(12) United States Patent
Chadha

(10) Patent No.: US 7,154,436 B1
(45) Date of Patent: Dec. 26, 2006

(54) SHARED CIRCUITRY FOR GPS AND LOCAL AREA NETWORK SYSTEMS

(75) Inventor: Kanwar Chadha, Los Gatos, CA (US)

(73) Assignee: Sire Technology, Inc., San Jose, CA (US)

( * ) Notice: Subject to any disclaimer, the term of this patent is extended or adjusted under 35 U.S.C. 154(b) by 0 days.

(21) Appl. No.: 10/199,649

(22) Filed: Jul. 19, 2002

Related U.S. Application Data

(60) Provisional application No. 60/306,631, filed on Jul. 19, 2001.

(51) Int. Cl.
- G01S 5/14 (2006.01)
- H01Q 7/20 (2006.01)
- H01Q 7/24 (2006.01)

(52) U.S. Cl. ............... 342/357.1; 342/357.09; 342/357.14; 370/338; 455/456.6

(58) Field of Classification Search ......... 342/357.1, 342/357.09, 357.14; 455/456–457; 370/338
See application file for complete search history.

(56) References Cited

U.S. PATENT DOCUMENTS

| | | | | |
|---|---|---|---|---|
| 5,877,724 A | * | 3/1999 | Davis | 342/357.1 |
| 5,945,944 A | * | 8/1999 | Krasner | 342/357.1 |
| 5,999,124 A | * | 12/1999 | Sheynblat | 342/357.09 |
| 6,107,960 A | * | 8/2000 | Krasner | 342/357.1 |
| 6,246,376 B1 | * | 6/2001 | Bork et al. | 342/357.13 |
| 6,249,245 B1 | * | 6/2001 | Watters et al. | 342/357.1 |
| 6,353,412 B1 | * | 3/2002 | Soliman | 342/457 |
| 6,373,430 B1 | * | 4/2002 | Beason et al. | 342/357.09 |
| 6,389,291 B1 | * | 5/2002 | Pande et al. | 455/456.5 |
| 6,430,498 B1 | * | 8/2002 | Maruyama et al. | 342/357.08 |
| 6,727,848 B1 | * | 4/2004 | Eschenbach | 342/357.09 |
| 2001/0014597 A1 | * | 8/2001 | Takiguchi et al. | 342/357.1 |
| 2002/0087265 A1 | * | 7/2002 | Thacker | 455/456 |
| 2002/0168988 A1 | * | 11/2002 | Younis | 455/456 |

OTHER PUBLICATIONS

BLUETOOTH—The universal radio interface for ad hoc, wireless connectivity, J. Haartsen, Ericsson Review, No. 3, p. 110-117, http://www.ericsson.com/about/publications/review/1998_03/article14.shtml, 1998.*

HighSpeed Surfing, Product Information, http://www.infomrt.com/highspeed/wirelessframe_main.html, p. 1-5, 2000.*

* cited by examiner

*Primary Examiner*—Thomas H. Tarcza
*Assistant Examiner*—F H Mull
(74) *Attorney, Agent, or Firm*—The Eclipse Group

(57) ABSTRACT

The present invention discloses a method, system, and apparatus for sharing circuitry within mobile GPS and Bluetooth receivers. By selectively combining the down-conversion, processing, and control sections, lower power dissipation can be achieved, along with lower form factors and lower manufacturing costs.

19 Claims, 3 Drawing Sheets

SHARED CIRCUITRY FOR GPS AND LOCAL AREA NETWORK SYSTEMS

CROSS REFERENCE TO RELATED APPLICATIONS

This application claims priority under 35 U.S.C. § 119(e) of U.S. Provisional Patent Application No. 60/306,631, filed Jul. 19, 2001, entitled "SHARED CIRCUITRY FOR GPS AND BLUETOOTH SYSTEMS," by Kanwar Chadha, which application is incorporated by reference herein.

This application is also related to U.S. Pat. No. 5,901,171, by Sanjai Kohli et al., entitled "TRIPLE MULTIPLEXING SPREAD SPECTRUM RECEIVER," which application is hereby incorporated by reference herein.

BACKGROUND OF THE INVENTION

1. Field of the Invention

The present invention relates in general to Global Satellite System (GSS) receivers, and in particular to a method and apparatus for sharing circuitry between Global Positioning System (GPS) and Local Area Network (LAN) (also called "Bluetooth" or "802.11") systems.

2. Description of the Related Art

Cellular telephony, including Personal Communication System (PCS) devices, has become commonplace. The use of such devices to provide voice, data, and other services, such as internet access, has provided many conveniences to cellular system users. Further, other wireless communications systems, such as two-way paging, trunked radio, Specialized Mobile Radio (SMR) that is used by police, fire, and paramedic departments, have also become essential for mobile communications.

A current thrust in the cellular and PCS arena is the integration of Global Positioning System (GPS) technology into cellular telephone devices and other wireless transceivers. For example, U.S. Pat. No. 5,874,914, issued to Krasner, which is incorporated by reference herein, describes a method wherein the basestation (also known as the Mobile Telephone Switching Office (MTSO)) transmits GPS satellite information, including Doppler information, to a remote unit using a cellular data link, and computing pseudoranges to the in-view satellites without receiving or using satellite ephemeris information.

This current interest in integrating GPS with cellular telephony stems from a new Federal Communications Commission (FCC) requirement that cellular telephones be locatable within 50 feet once an emergency call, such as a "911" call (also referred to as "Enhanced 911" or "E911") is placed by a given cellular telephone. Such position data assists police, paramedics, and other law enforcement and public service personnel, as well as other agencies that may need or have legal rights to determine the cellular telephone's position. Further, GPS data that is supplied to the mobile telephone can be used by the mobile telephone user for directions, latitude and longitude positions (locations or positions) of other locations or other mobile telephones that the cellular user is trying to locate, determination of relative location of the cellular user to other landmarks, directions for the cellular user via internet maps or other GPS mapping techniques, etc. Such data can be of use for other than E911 calls, and would be very useful for cellular and PCS subscribers.

The approach in Krasner, however, is limited by the number of data links that can be connected to a GPS-dedicated data supply warehouse. The system hardware would need to be upgraded to manage the additional requirements of delivering GPS information to each of the cellular or PCS users that are requesting or requiring GPS data, which requirements would be layered on top of the requirements to handle the normal voice and data traffic being managed and delivered by the wireless system.

Further, GPS receivers in cellular telephones may not always have an unobstructed view of the sky to be able to receive a sufficient number of satellite signals to perform position calculations. The GPS receiver may need additional information, such as Doppler, ephemeris, or time aiding to determine position, or, in other situations, to determine a more accurate position for the GPS receiver.

The GPS receiver may also be in an area where a Local Area Network (LAN), or Point-to-Point radio link, can provide assistance to the GPS receiver, or provide approximate position better than or instead of GPS. Such LANs and Point-to-Point networks, also known as Bluetooth systems, are used in buildings and other areas where cellular and/or GPS signals are difficult to receive.

In order to make such GPS/Bluetooth devices possible, low power dissipation is a major design concern. Operation of two separate systems that have common circuit functions will increase power dissipation of such devices. Further, the cost and form factor (size) of such parallel systems makes them difficult and expensive to produce, as well as unwieldy in certain applications.

It can be seen, then, that there is a need in the art for combining GPS and Bluetooth systems. It can also be seen that there is a need in the art to be able to aid the GPS receiver for position determination. It can also be seen that there is a need in the art to be able to aid the GPS receiver to provide more precise position determination. It can also be seen that there is a need in the art for a large cellular system that can use and/or supply GPS information to cellular users for a number of applications, including E911 without the requirement of geographically proximate basestations.

SUMMARY OF THE INVENTION

To minimize the limitations in the prior art described above, and to minimize other limitations that will become apparent upon reading and understanding the present specification, the present invention discloses a system, device, and method for aiding a mobile device in determining the position of the mobile device using LANs. Through intelligent combination of the circuitry, the overall footprint of the circuit on the semiconductor die can be reduced, and the resultant integrated circuit can consume less power.

A Global Positioning System (GPS) receiver in accordance with the present invention comprises a downconverter section and a processor section. The downconverter section converts the GPS satellite spread spectrum radio frequency signals from a transmitted frequency to a lower frequency. The processor section processes the lower frequency signals to determine the geolocation of the GPS receiver. At least one of the downconverter section and the processor section utilizes circuitry that is shared between the GPS signal and at least on other radio frequency signal, typically a LAN signal, but can also be a cellular telephone signal or other radio frequency signal.

It is an object of the present invention to combine GPS and LAN (Bluetooth) systems. It is another object of the present invention to provide an aid to the GPS receiver for position determination. It is another object of the present invention to provide an aid to the GPS receiver to provide more precise position determination. It is another object of the present invention to provide for a large cellular system that can use and/or supply GPS information to cellular users for a number of applications, including E911 without the requirement of geographically proximate basestations.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

GPS Architecture

Figure 1:
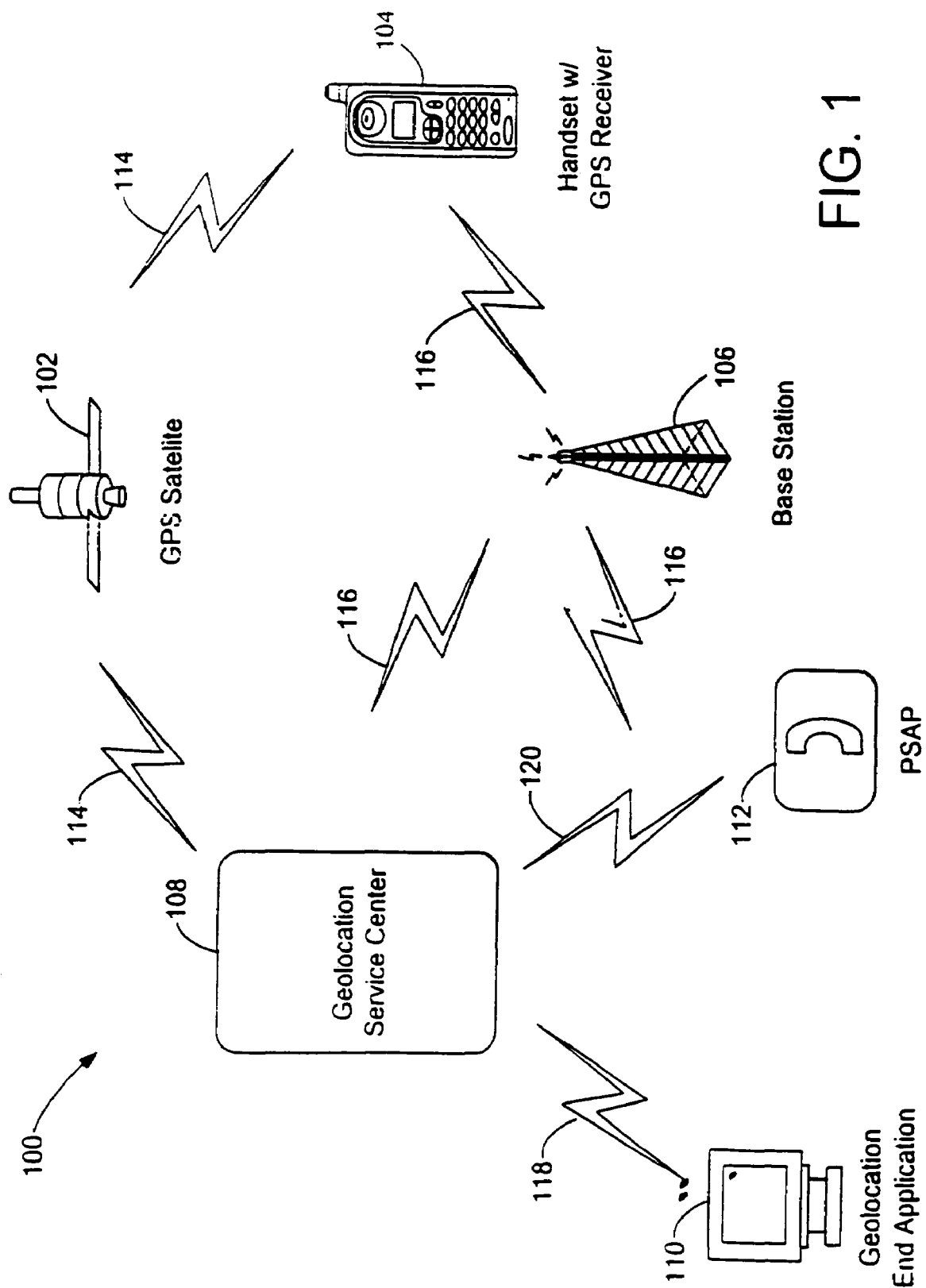
FIG. 1 illustrates a typical GPS architecture.

FIG. 1 illustrates a typical GPS architecture.

The wireless handset location technology of the present invention uses GPS technology in support of various wireless handset devices for the implementation of E911 and geo-location services. By taking the advantage of the low cost, low power, high performance and high accuracy GPS receivers enabled by the present invention, as well as the wireless network communication services, the wireless handset location technology of the present invention provides highly reliable and economical solutions to the Wireless Aided GPS. The wireless handset location technology of the present invention supports all kinds of geo-location services, and also accommodates wide range of wireless communication platforms, including GSM, CDMA, TDMA, AMP, and even pager systems. FIG. 1 portrays the concept of wireless handset location technology.

System 100 illustrates a GPS satellite 102, which is illustrative of the constellation of GPS satellites 102 that are in orbit, a wireless handset 104 that comprises a GPS receiver, a base station 106, a geolocation (server) service center 108, a geolocation end application 110, and a Public Safety Answering Point (PSAP) 112.

The GPS satellite 102 transmits spread spectrum signals 114 that are received at the wireless handset 104 and the geolocation server 108. For ease of illustrative purposes, the other GPS satellites 102 are not shown, however, other GPS satellites 102 also are transmitting signals 114 that are received by the wireless handset 104 and the geolocation server 108. If the wireless handset 104 can receive strong enough signals 114, the GPS receiver in the wireless handset 104 can compute the position of the wireless handset 114 as is typically done in the GPS system. However, wireless handsets are typically not able to receive strong enough signals 114, or are not able to receive signals from enough GPS satellites 102 to autonomously compute the position of the wireless handset 104, but can still communicate with base station 106. Thus, base station 106 can communicate information via signals 116 to handset 104 to allow handset 104 to compute the location, or can communicate information from handset 104 to the geolocation server 108 to allow the geolocation server 108 to compute the position of the handset 104. If the basestation 106 is transferring information to the handset 104 to allow the handset 104 to compute position, it is called "wireless-aided GPS," whereas when the basestation 106 transfers information from the handset 104 to the geolocation server 108 for the geolocation server 108 to compute the position of the handset 104 it is called "network-centric GPS."

Geolocation server also communicates with geolocation application 110 via signals 118 and with PSAP 112 via signals 120. These signals 118 and 120 can either be via wireless links or can be through the land line telephone network or other wire-based networks.

The wireless handset 104 location technology of the present invention comprises two major service systems: the wireless handset 104 with the GPS receiver of the present invention and the geo-location server 108 containing geo-location software modules.

The handset 104 comprises a typical wireless handset 104 section that performs the call-processing (CP) function, and a GPS section for position computation, pseudorange measurement, and other GPS functions performed at the handset 104 of the present invention. A serial communication link, or other communications link, performs the communications between the CP section and the GPS section. A collection of hardware lines is utilized to transmit signals between the CP and GPS section.

Overview

Figure 2:
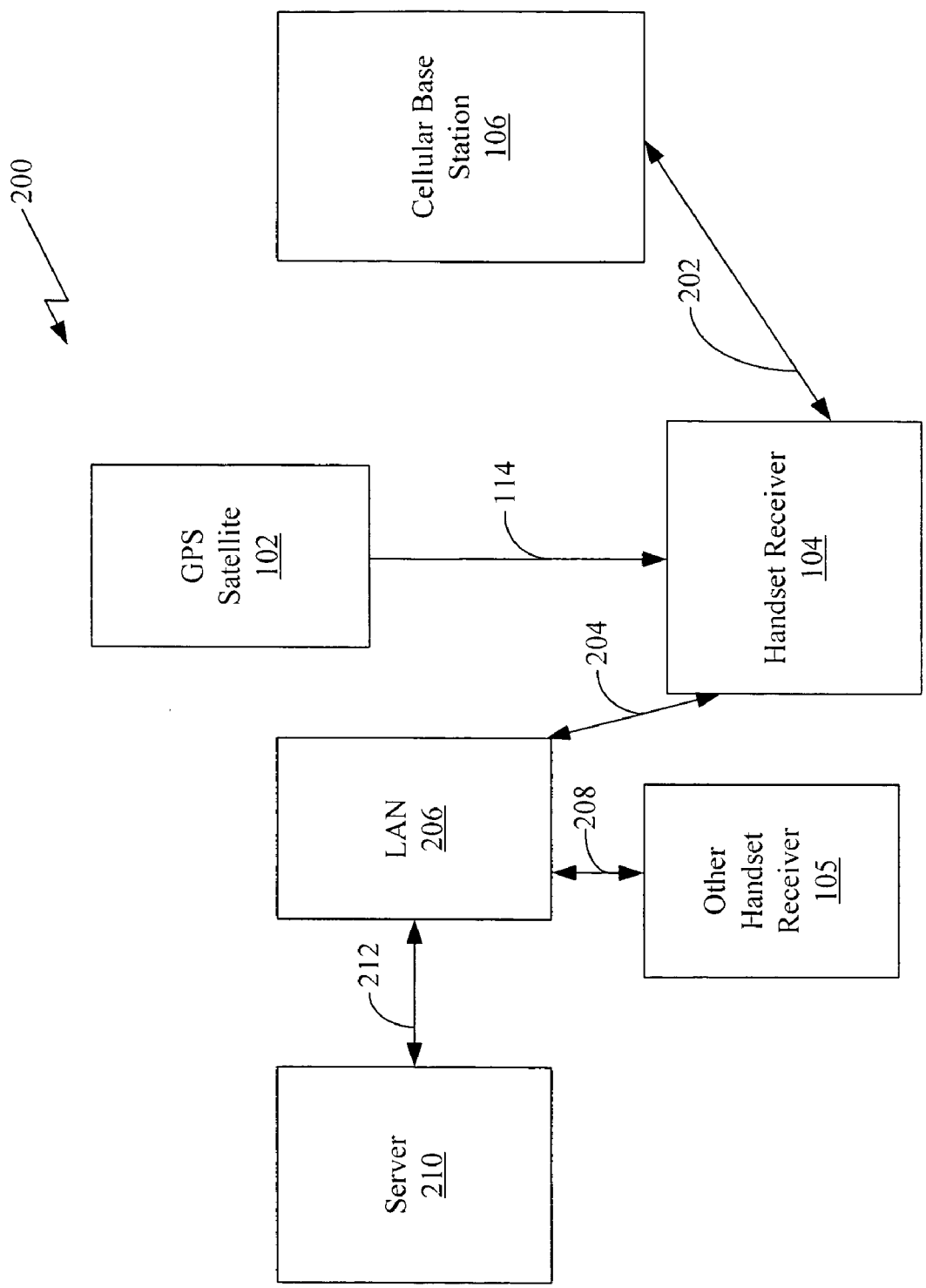
FIG. 2 illustrates a typical embodiment of the present invention.

FIG. 2 illustrates a typical embodiment of the present invention.

The present invention uses LAN technology, including Point-to-Point systems such as Bluetooth, to augment or replace the cellular aided system of FIG. 1. System 200 illustrates handset receiver 104 receiving signals 114 directly from GPS satellite 102, and exchanging signals 202 with cellular base station 106. Further, the present invention allows receiver 104 to exchange signals 204 through a LAN 206 with other receiver handsets 105 via signals 208 or a server 210 via signals 212. Signals 212 and 208 allow further aiding signals to the handset 104, as well as providing replacements or augmentations to the GPS signals 114 and/or the cellular signals 202. Further, receiver 104 can transmit directly to receiver 105 in a point to point schema if desired or available in the network 206.

The LAN 206 can be used to transmit position information determined by the GPS receiver 104 to other receivers 105, or to Wide Area Networks (WAN), or to the cellular system via base station 106 or the wired telephone network. Such a position can be calculated by the GPS receiver 104 without aiding from the cellular system or LAN 206, or can be the position calculated with assistance from the LAN 206, cellular system, or any other aid. Further, the position can be calculated by the LAN 206 itself, since the LAN 206 has the ability to determine which transceivers within the LAN 206 are receiving signals.

Figure 3:
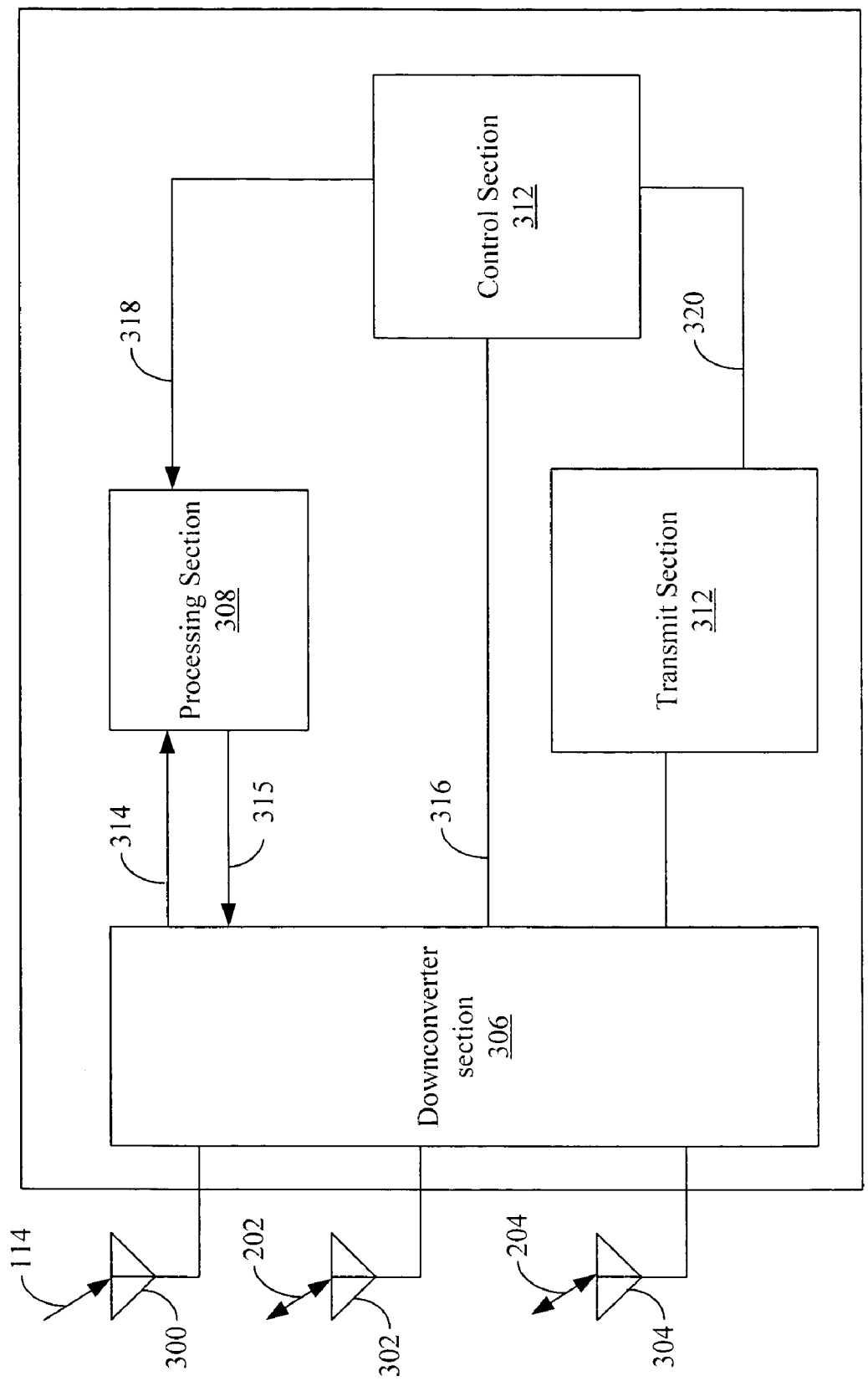
FIG. 3 illustrates the shared circuitry of the present invention.

FIG. 3 illustrates the shared circuitry of the present invention.

Receiver 104 comprises antennas 300, 302, and 304, along with downconverter section 306, processing (or processor) section 308, transmit (or transmitter) section 310, and control section 312. Antennas 300–304 can be combined into a single antenna or two antennas if desired to conserve size and weight of receiver 104.

Downconverter Section Circuitry Sharing

The downconverter section 306 downconverts signals 114 from the GPS satellites, signals 202 from the cellular system, and signals 204 from the LAN. Common functions, such as division of signals, local oscillator generation, etc. can be shared among two or all three downconversions within downconverter section 306 to conserve size and power dissipation. Further, the circuitry within downconverter section 306 can be optimized to provide minimal interference between the received signals 114, 202, and 204, as well as providing optimal or selective power dissipation of downconverter section 306 by use of control section 312. Intelligent combination of functions within downconverter section 306 also minimizes the interference created when multiple Radio Frequency (RF) transmitters and receivers are in close physical proximity.

Processing Section Circuitry Sharing

Cellular signal 202 and GPS signal 114, once downconverted by downconverter section 306, often times have similar qualities, e.g., although the signals are not identical, they will both contain similar signal characteristics after conversion to baseband, such as in-phase and quadrature phase signals that are processed by the processing section 308. Further, Bluetooth signal 204 can have similar processing functions required to decode the data in the signal 204. As such, processing section 308, which is in receipt of the downconverted signal 314, can share circuitry, either on a time basis (similar to a TDMA schema, or a background/foreground task on a computer processor) or on a common output basis (where two circuits are driven by a common oscillator, for example) such that power dissipation is reduced or the circuit is optimized to perform such tasks as desired by the user. Further, processing section 308 can send information back to the downconverter section 306 directly using signals 315, or can send signals 315 directly to transmitter section 310 if desired.

Within processing section 308, memory can also be shared to reduce the amount of memory needed to run two processing systems in parallel. Such memory can be controlled by control section 312, or can be controlled by processing section 308.

Control Section

Control section 312 can control the power dissipation in downconverter section 306, processing section 308, and transmitter section 310 using control and monitor lines 316, 318, and 320, respectively. Further, by monitoring the sections 306, 308, and 310, the control section can determine which signals 114, 202, and 204 need to be processed, etc. such that the circuitry and management of power and resources within handset 104 is optimized.

Applications

By combining the circuitry as in the present invention, specific platforms, such as wearable platforms like watches, cellular telephones, etc. that are used in various environments can now generate and transmit position information. Even if such platforms are not able to receive GPS signals all the time, they will likely be close to a LAN or Point-to-point LAN access point, which will allow them to obtain and transmit position information as required. The control section 312 can determine which technology, e.g., LAN, GPS, aided GPS, or cellular based will likely produce the best position information, and control the processing section 308, downconverter section 316, and transmit section 310 to product the best position calculation. Further, the sharing of memory and reduction in interference between the RF systems through use of the present make the present invention viable in many application where separate, parallel systems would not be an acceptable alternative.

The present invention also allows non-telephone devices to use the telephone system, because the LAN-ready device can now transmit to the LAN via point-to-point transmissions, where the receiving point may have access to the telephone system, either directly or through the LAN. For example, a watch may be able to transmit to a Personal Data Assistant (PDA) via point-to-point transmission, and the PDA can either have a cellular modem built in, or have access to the LAN because of additional transmission power capabilities. As such, a single GPS receiver can send GPS information through the LAN and determine position of other items because of the GPS receiver's proximity to the device the GPS receiver is transmitting through on the LAN.

CONCLUSION

This concludes the description of the preferred embodiment of the invention. The following paragraphs describe some alternative methods of accomplishing the same objects. The present invention, although described with respect to GPS systems, can be utilized with any Satellite Positioning System (SATPS) without departing from the scope of the present invention. Further, although described with respect to a cellular telephone system, other wireless or wire-based systems can be used in place of or in conjunction with the cellular system herein described without departing from the scope of the present invention. While LANs are discussed herein, other local are networks, such as 802.11 or 802.11 compatible networks, bluetooth, or other local area networks also fall within the scope of the present invention.

A Global Positioning System (GPS) receiver in accordance with the present invention comprises a downconverter section and a processor section. The downconverter section converts the GPS satellite spread spectrum radio frequency signals from a transmitted frequency to a lower frequency. The processor section processes the lower frequency signals to determine the geolocation of the GPS receiver. At least one of the downconverter section and the processor section utilizes circuitry that is shared between the GPS signal and at least on other radio frequency signal, typically a LAN signal, but can also be a cellular telephone signal or other radio frequency signal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A Global Positioning System (GPS) receiver for determining geolocation from at least one GPS satellite, the GPS receiver being capable of receiving a GPS signal comprising a spread spectrum radio frequency signal, the GPS receiver comprising:

a downconverter section for converting time spread spectrum radio frequency signals from a transmitted frequency to a lower frequency; and a processor section, for processing the lower frequency signals to determine the geolocation of the GPS receiver, wherein at least one of the downconverter section and the processor section utilizes circuitry that is shared between the GPS signal and a Local Area Network (LAN) frequency signal that carries an augmentation to the GPS receiver and the geolocation of the GPS receiver is determined with the lower frequency signal obtained from the GPS signal received from a GPS satellite along with the augmentation when the GPS receiver is unable to acquire sufficient numbers of GPS satellites to determine time geolocation of the OPS receiver.

2. The GPS receiver of claim 1, wherein the Local Area Network (LAN) frequency signal comprises a Bluetooth signal.

3. The GPS receiver of claim 2, wherein in the circuitry is shared with a radio frequency signal comprising a cellular telephone signal.

4. The GPS receiver of claim 3, further comprising a transmitter section for transmitting signals to at least one of a LAN or a cellular telephone system.

5. The GPS receiver of claim 4, further comprising a control section, for controlling the power dissipation in at least one of the transmitter section, the downconverter section, and the processor section.

6. The GPS receiver of claim 5, wherein the control section determines which radio frequency signal will provide a best geolocation calculation.

7. The GPS receiver of claim 6, wherein the control section further controls at least one of the processor section, downconverter section, or transmitter section to produce the best position calculation.

8. The GPS receiver of claim 7, wherein the processor section further comprises a shared memory section.

9. A Global Positioning System (GPS) receiver for determining geolocation, the GPS receiver being capable of receiving a GPS signal comprising a spread spectrum radio frequency signal from at least one GPS satellite, the GPS receiver comprising:
   a downconverter section for converting the spread spectrum radio frequency signals from a transmitted frequency to a lower frequency;
   a processor section, for processing the lower frequency signals of the GPS receiver; and
   a transmitter section, wherein the downconverter section and the processor section utilize circuitry that is shared between the GPS signal and a Local Area Network (LAN) signal where Local Area Network provides augmentations to the GPS receiver that is used along with the GPS signal to determine the geolocation of the GPS when sufficient GPS signals are unavailable to determine fine geolocation of the GPS receiver.

10. The GPS receiver of claim 9, wherein the circuitry that is shared between the GPS signal and the LAN signal is further shared with a cellular telephone signal, and the transmitter section comprises circuitry that is shared between the LAN signal and the cellular telephone signal.

11. The GPS receiver of claim 10, further comprising a control section for controlling the power dissipation in at least one of the transmitter section, the downconverter section, and the processor section.

12. The GPS receiver of claim 11, wherein the control section determines which radio frequency signal will provide a best geolocation calculation.

13. The GPS receiver of claim 12, wherein the control section further controls at least one of the processor section, downconverter section, or transmitter section to produce the best position calculation.

14. The GPS receiver of claim 13, wherein the processor section further comprises a shared memory section.

15. The GPS receiver of claim 13, wherein the transmitter transmit section can transmit to another GPS receiver via the LAN.

16. The GPS receiver of claim 15, wherein the geolocation of the GPS receiver is determined by a server connected to the LAN.

17. The GPS receiver of claim 15, wherein the geolocation of the OPS receiver is determined by the LAN.

18. The GPS receiver of claim 13, wherein the processor section determines the geolocation of the GPS receiver using GPS and LAN signals.

19. The GPS receiver of claim 18, wherein the processor section determines the geolocation of the GPS receiver using GPS, LAN and cellular telephone signals.

* * * * *

(12) EX PARTE REEXAMINATION CERTIFICATE (7536th)
United States Patent
Chadha

(10) Number: US 7,154,436 C1
(45) Certificate Issued: May 25, 2010

(54) SHARED CIRCUITRY FOR GPS AND LOCAL AREA NETWORK SYSTEMS

(75) Inventor: Kanwar Chadha, Los Gatos, CA (US)

(73) Assignee: Sirf Technology, Inc., San Jose, CA (US)

Reexamination Request:
No. 90/010,452, Mar. 13, 2009

Reexamination Certificate for:
Patent No.: 7,154,436
Issued: Dec. 26, 2006
Appl. No.: 10/199,649
Filed: Jul. 19, 2002

Related U.S. Application Data

(60) Provisional application No. 60/306,631, filed on Jul. 19, 2001.

(51) Int. Cl.
*G01S 5/14* (2006.01)

(52) U.S. Cl. .................. 342/357.1; 342/357.09; 342/357.14; 370/338; 455/456.6

(58) Field of Classification Search .................. None
See application file for complete search history.

(56) References Cited

U.S. PATENT DOCUMENTS

| | | | |
|---|---|---|---|
| 4,785,463 A | 11/1988 | Janc et al. |
| 5,043,736 A | 8/1991 | Darnell et al. |
| 5,202,829 A | 4/1993 | Geier |
| 5,223,844 A | 6/1993 | Mansell et al. |
| 5,225,842 A | 7/1993 | Brown et al. |
| 5,311,194 A | 5/1994 | Brown |
| 5,317,323 A | 5/1994 | Kennedy et al. |
| 5,365,450 A | 11/1994 | Schuchman et al. |
| 5,825,327 A | 10/1998 | Krasner |
| 6,002,363 A | 12/1999 | Krasner |
| 6,246,376 B1 | 6/2001 | Bork et al. |

FOREIGN PATENT DOCUMENTS

| | | |
|---|---|---|
| CA | 2177310 A1 | 12/1996 |
| EP | 0512789 A2 | 11/1992 |
| WO | WO 97/28455 | 8/1997 |
| WO | WO 99/63358 | 12/1999 |
| WO | WO 00/36757 | 6/2000 |

*Primary Examiner*—Peter C. English

(57) ABSTRACT

The present invention discloses a method, system, and apparatus for sharing circuitry within mobile GPS and Bluetooth receivers. By selectively combining the downconversion, processing, and control sections, lower power dissipation can be achieved, along with lower form factors and lower manufacturing costs.

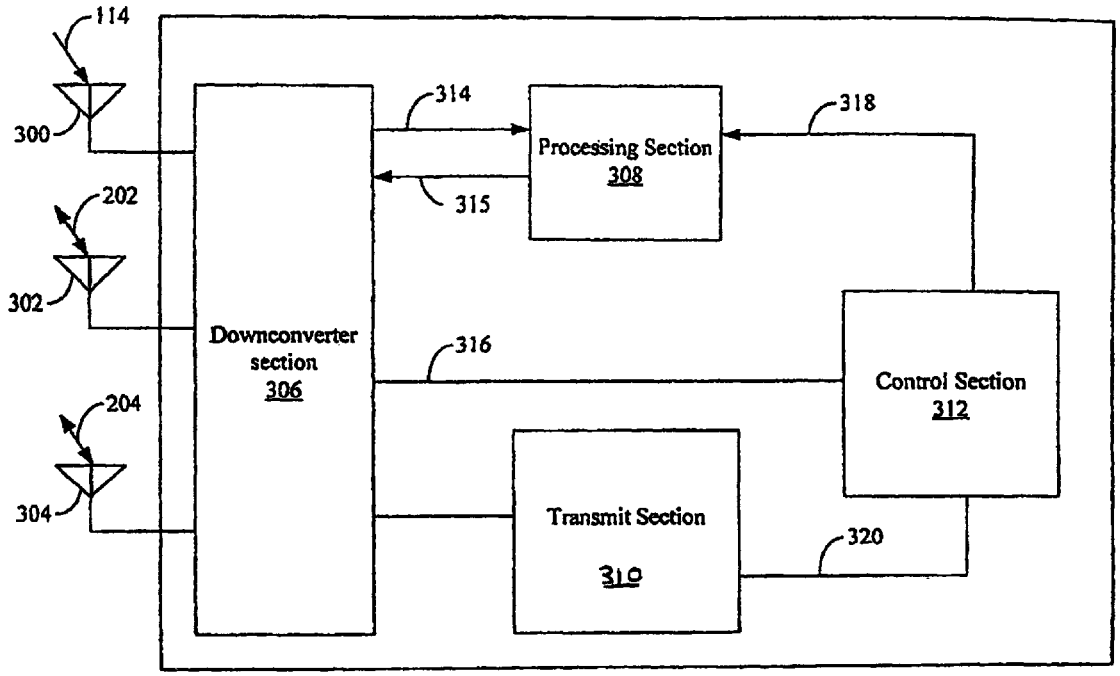

AMENDED

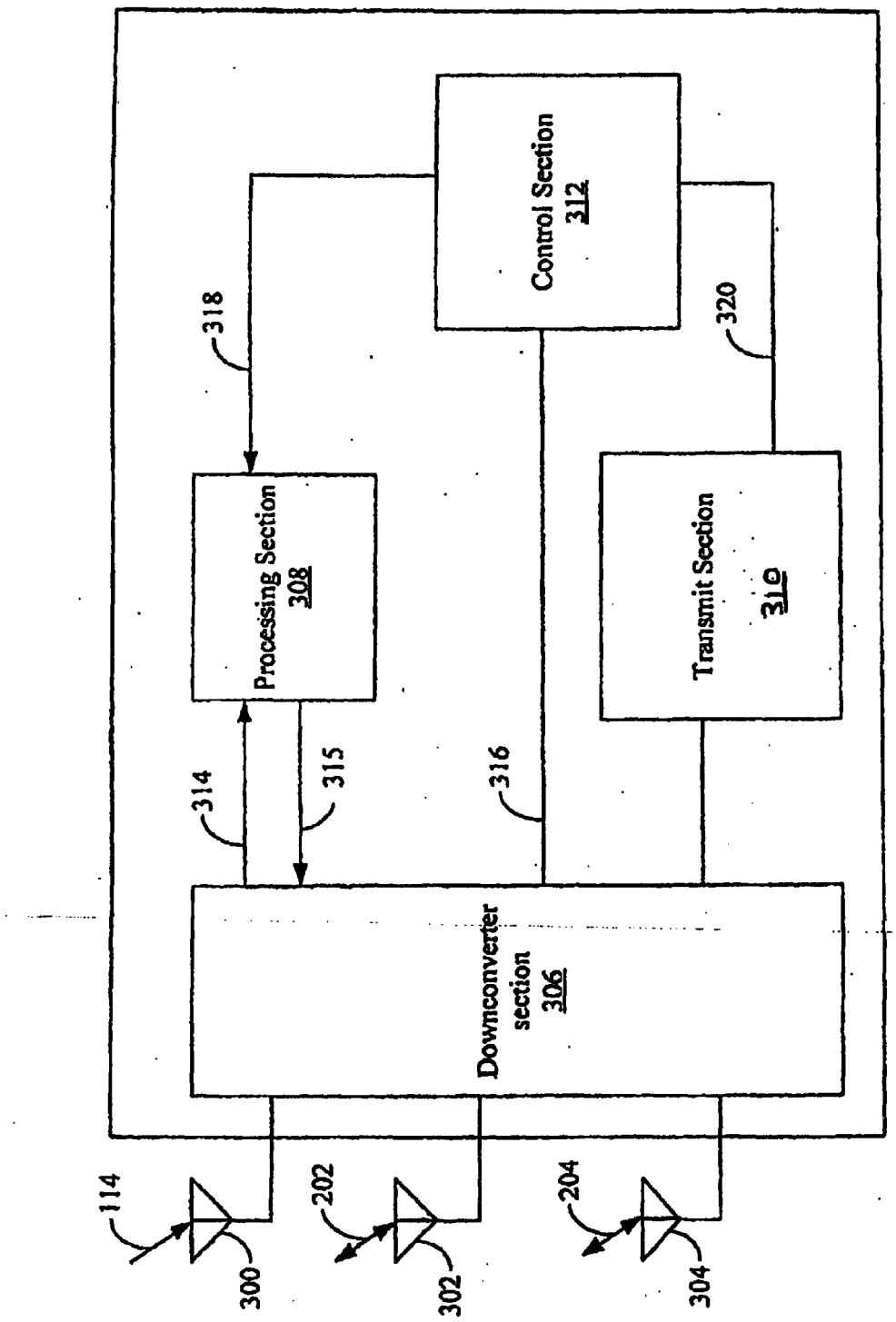
FIG. 3
AMENDED

US 7,154,436 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, line 16:

Cellular signal 202 and GPS signal 114, once downconverted by downconverter section 306, often times have similar qualities, e.g., although the signals are not identical, they will both contain similar signal characteristics after conversion to baseband, such as in-phase and quadrature phase signals that are processed by the processing section 308. Further, Bluetooth signal 204 can have similar processing functions required to decode the data in the signal 204. As such, processing section 308, which is in receipt of the downconverted signal 314, can share circuitry, either on a time basis (similar to a TDMA schema, or a background/foreground task on a computer processor) or on a common output basis (where two circuits are driven by a common oscillator, for example) such that power dissipation is reduced or the circuit is optimized to perform such tasks as desired by the user. Further, processing section 308 can send information back to the downconverter section 306 directly using signals 315, or can send signals 315 directly to transmitter section 310 if desired. *Furthermore, the circuitry that is shared between the GPS signal and the LAN signal may be further shared with a cellular telephone signal, in which case, the transmitter section includes circuitry that is shared between the LAN signal and the cellular telephone signal.*

The drawing figures have been changed as followes:

In FIG. 3, the lower occurrence of reference number 312 has been changed to 310.

AS A RESULT OF REEXAMINATION, IT HAS BEEN DETERMINED THAT:

Claims 1-9 are cancelled.

Claims 10, 15 and 17 are determined to be patentable as amended.

Claims 11-14, 16, 18 and 19, dependent on an amended claim, are determined to be patentable.

10. [The GPS receiver of claim 9.] *A Global Positioning System (GPS) receiver for determining geolocation, the GPS receiver being capable of receiving a GPS signal comprising a spread spectrum radio frequency signal from at least one GPS satellite, the GPS receiver comprising:*

*a downconverter section for converting the spread spectrum radio frequency signals from a transmitted frequency to a lower frequency;*

*a processor section, for processing the lower frequency signals of the GPS receiver; and*

*a transmitter section,* wherein the downconverter section and the processor section utilize circuitry that is shared between the GPS signal and a Local Area Network (LAN) signal *where the Local Area Network provides augmentations to the GPS receiver that are used along with the GPS signal to determine the geolocation of the GPS receiver when sufficient GPS signals are unavailable to determine the geolocation of the GPS receiver;* wherein the circuitry that is shared between the GPS signal and the LAN signal is further shared with a cellular telephone signal, and the transmitter section comprises circuitry that is shared between the LAN signal and the cellular telephone signal.

15. The GPS receiver of claim 13, wherein the transmitter [transmit] section can transmit to another GPS receiver via the LAN.

17. The GPS receiver of claim 15, wherein the geolocation of the [OPS] *GPS* receiver is determined by the LAN.

* * * * *